RE I SSUED

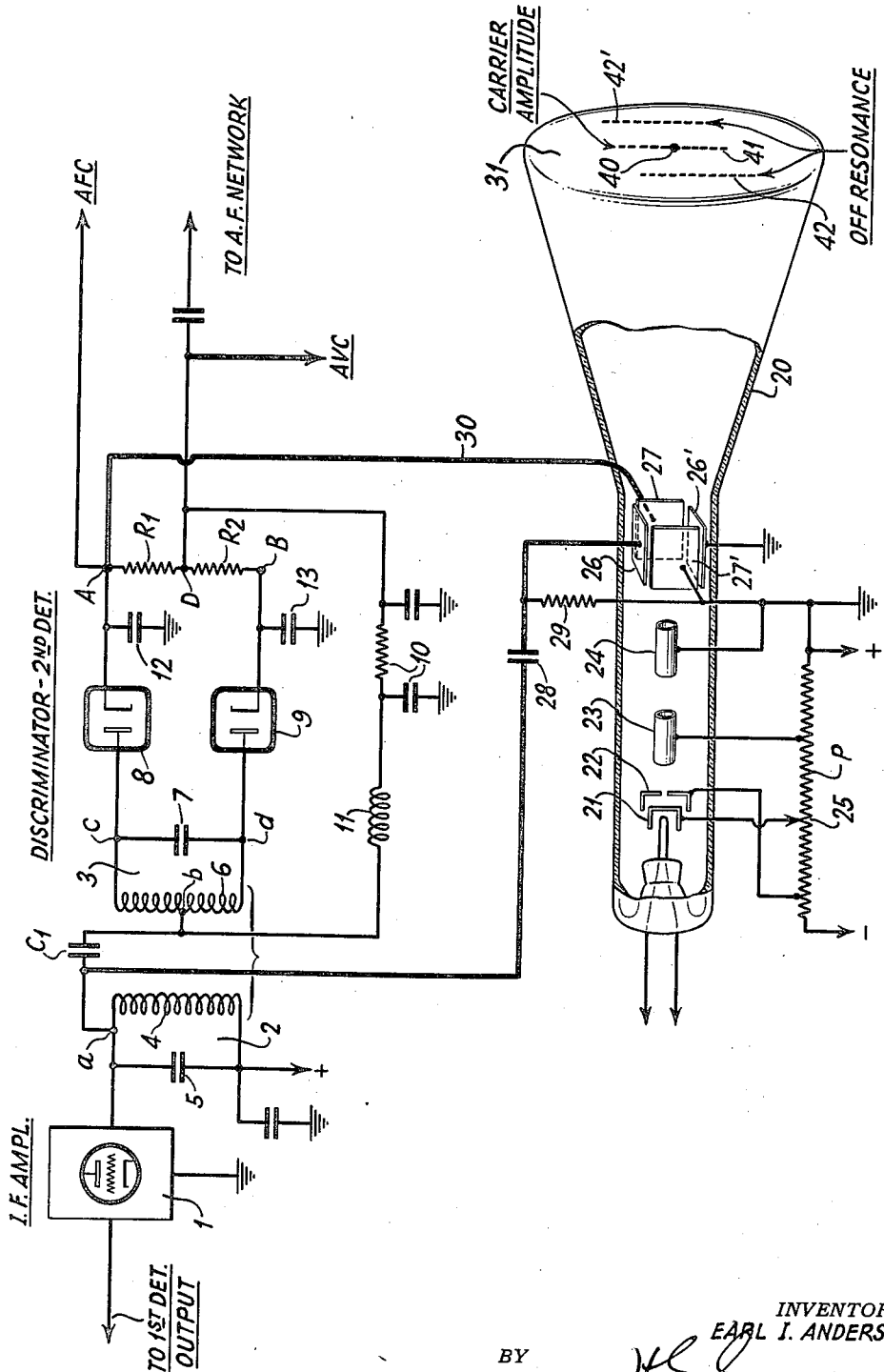

Patented Mar. 26, 1940

JAN 13 1942

2,194,516

UNITED STATES PATENT OFFICE 2,194,516

VISUAL SIGNAL CARRIER INDICATOR

Earl I. Anderson, Bayside, Long Island, N. Y., assignor to Radio Corporation of America, a corporation of Delaware Application April 12, 1938, Serial No. 201,591

9 Claims. (Cl. 250—40)

My invention relates to visual signal indicators, and more particularly to a device for visually indicating the amplitude and resonance conditions of a received signal carrier.

One of the main objects of my invention is to provide a method of indicating the strength of an incoming signal, and simultaneously indicating whether or not the receiver is properly tuned.

Another important object of the invention is to provide a visual signal indicator which indicates variations in signal strength and improper tuning by respectively different effects; the device, additionally, informing the user of a receiver to which side of carrier resonance the receiver is tuned, and in which direction the receiver is to be adjusted in tuning in order to attain resonance.

Another important object of this invention is to provide a visual current indicator of the cathode ray tube type, wherein the electron stream is focused to cause a spot of light to appear in the center of the fluorescent screen; signal carrier voltage being applied between a pair of deflection plates to convert the spot into a vertical line whose length is a function of the carrier strength; and the vertical line shifting to either side of a predetermined central position upon a shift in the carrier frequency, the shifting of the vertical line being caused by the application to another pair of deflection plates of a direct current voltage whose polarity and magnitude are a function of the direction and amount of carrier frequency shift.

Still other objects of my invention are to improve generally the efficiency and operation of visual signal indicators, and more particularly to provide an indicator arrangement which is not only reliable in operation, but is economically manufactured and assembled in a radio receiver.

The novel features which I believe to be characteristic of my invention are set forth in particularity in the appended claims; the invention itself, however, as to both its organization and method of operation will best be understood by reference to the following description taken in connection with the drawing in which I have indicated diagrammatically a circuit organization whereby my invention may be carried into effect.

Referring now to the accompanying drawing there is shown that portion of a radio receiving system which is necessary to a proper understanding of this invention; the said portion including a visual indicator tube having circuit connections capable of producing the indication effects desired. The receiving system is of the superheterodyne type, and only the I. F. amplifier and succeeding combined discriminator-second detector network is shown. It may be stated that this portion of the receiver circuit is substantially the same as that disclosed, and claimed, by S. W. Seeley in application Serial No. 45,413 filed Oct. 17, 1935 granted June 21, 1938 as U. S. Patent 2,121,103. The I. F. amplifier 1 may have impressed upon its input terminals the I. F. energy produced in the usual first detector output circuit. It is to be understood that the amplifier 1 may be preceded by any desired type of signal collector, the latter being followed by tunable radio frequency amplifiers which in turn feed the tunable signal input circuit of the first detector. Of course, a tunable local oscillator, having a tank circuit frequency differing from the signal frequencies over the entire local oscillator range by the value of the operating I. F., is coupled to the first detector.

Assuming that the I. F. energy has a frequency value of approximately 450 kc., the energy is amplified in the amplifier 1, and then transmitted to the discriminator network through the magnetically coupled resonant circuits 2 and 3. The resonant output circuit 2 includes the coil 4 and the shunt condenser 5, the coil 4 being magnetically coupled to the secondary coil 6; the latter has the condenser 7 shunted thereacross. It will be understood that each of the resonant circuits 2 and 3 is fixedly tuned to the operating I. F. value. The high potential point $a$ of the primary circuit 2 is connected to the mid-point $b$ of coil 6 through a direct current blocking condenser $C_1$.

The diode rectifier 8 has its anode connected to the point $c$ of the secondary circuit 3, while the diode rectifier 9 has its anode connected to point $d$ of the secondary circuit. The cathodes of diodes 8 and 9 are connected through resistors $R_1$ and $R_2$ of equal magnitude. The junction D of these resistors is connected to the mid-point $b$ through a path which includes the I. F. filter elements 10 arranged in series with the I. F. choke coil 11. Appropriate I. F. bypass condensers 12 and 13 are respectively connected to ground from points A and B of the output load resistors of rectifiers 8 and 9. As explained in the aforesaid Seeley patent, the direct current voltage developed across resistors $R_1$ and $R_2$ is zero when the signal energy impressed on primary circuit 2 has a carrier frequency value equal to the operating I. F. For carrier frequencies which depart from this operating value there is developed a direct current voltage which is taken off from point A, and whose polarity and magnitude depend upon the direction and amount of shift respectively of the I. F. energy.

If the receiver is of the type employing automatic frequency control (AFC), as shown in the aforesaid Seeley patent, AFC bias may be tapped off from point A, and AVC and audio voltage may be tapped off from point D. It is not believed necessary to explain the uses for these three voltages, since they are fully described in the Seeley patent. It is sufficient to point out that the AFC bias is used to control the gain of a frequency control tube connected to simulate an auxiliary reactance across the oscillator tank circuit. In this way the AFC bias is employed to correct the oscillator tank circuit in a sense to compensate for detuning of the receiver. The AVC voltage is employed to regulate the gain of one, or more, amplifier stages in a sense to maintain the carrier amplitude substantially uniform at the discriminator input network. Of course the audio voltage may be amplified in any desired audio network, and finally reproduced.

The I. F. energy at the primary circuit 2 is utilized, according to my invention, to denote visually variations in the carrier amplitude. Furthermore, the direct current voltage developed at A is employed visually to indicate the direction and amount of I. F. carrier frequency departure. These indications are produced on the fluorescent screen of a cathode ray tube. The latter may be of the 913 type, if desired. However, for the purposes of this application the indicator tube is schematically represented. Those skilled in the art are fully aware of the manner of constructing tubes of this type. The tube comprises, in general, an envelope 20, and within the envelope is disposed an electron emitter 21, a control grid 22 and successive focusing electrodes 23 and 24 for producing an electron beam.

The direct current voltage supply source may comprise a potentiometer P; the emitter being tapped at a point 25 which is positive with respect to the grip tap point. The focusing anodes 23—24 may be connected to points on P which are successively more positive with respect to point 25. The four deflection plates 26—26' and 27—27' are arranged to act on the electron beam so as to produce the patterns to be described later. Plate 26 is connected to point $a$ of primary circuit 2 through a direct current blocking condenser 28; plates 26' and 27' are connected to ground, as is the positive end of P. The plates 26' and 27' are connected to the point on P to which focusing anode 24 is connected. A resistor 29 connects plate 26 to ground and plate 26'. The plate 27 is connected by the direct current voltage connection 30 to point A of the discriminator. In other words, I. F. carrier energy is applied to plates 26—26', whereas AFC bias (or, more generally, a frequency-responsive direct current voltage) is applied to plates 27—27'.

The numeral 31 denotes the fluorescent screen of the indicator tube; the fluorescent coating on the inner face of the viewing end of the envelope 20 provides the screen. The electron beam causes the central spot of light 40 to appear when no signals are received. The spot 40 is lengthened, on either side of the central point, into a vertical line when the carrier amplitude increases at I. F. resonance. However, when the I. F. carrier departs from the assigned frequency value, the line 41 shifts towards positions 42 or 42' depending on the direction of the frequency departure. The length of the vertical line 41 will be a function of the I. F. carrier amplitude; hence, it readily indicates the intensity of received signals.

Improper tuning, or frequency drift of the local oscillator, will cause a voltage to appear at point A. The polarity of the voltage depends upon whether the I. F. carrier frequency has shifted to the low or high side of the assigned frequency value, and the magnitude of the voltage will depend upon the amount of frequency departure which in turn will determine the distance to the vertical line moves laterally.

The following explanation is given of the mode of operation of the discriminator; this will make clear the relation between the I. F. energy frequency departure and the polarity and magnitude changes at point A. Assuming that the condenser $C_1$ is so large that the voltage drop in it is negligible, it will be seen that the points $a$ and $b$ are at the same potential. Now, the phase of $a$ with respect to ground potential is zero when the I. F. carrier has the assigned frequency value, for at resonance there is no phase shift in the tank circuit. Thus, the point $b$ is at zero phase. The current in circuit 2 induces a voltage in circuit 3, and this is distributed equally about the mid-point $b$. At a given instant point $c$ is as much positive as point $d$ is negative. The voltages impressed on the two rectifiers 8 and 9, and the latter may be of the 6H6 type if desired, are, therefore, equal although opposite in phase. The rectified outputs depend only on the magnitudes, and, hence, the voltage drops across resistors $R_1$ and $R_2$ will be equal. Since the two rectifiers are connected in series opposition, the potential difference between points A and B will be zero. This balance occurs only when the frequency is equal to the resonant frequency of the two loosely coupled circuits 2 and 3.

Suppose now that the I. F. carrier differs considerably from the resonant frequency. There will then be a phase shift of nearly 90 degrees in the circuit. The voltages induced in the two halves of the secondary coil 6 are still equal in magnitude, but they are opposite in phase with respect to point $b$. The voltage drop across circuit 2 is now added vectorially to the induced voltages. Thus, the potential at one side of the secondary coil 6, say point $c$, will be the sum of the induced voltage $b$—$c$ and the drop across circuit 2; on the other hand, the potential of the other end of coil 6, that is point $d$, will be the difference between the drop in circuit 2 and the voltage in $b$—$d$. It follows that the input voltage of one rectifier, the upper in the assumed case, is much greater than that in the other. Therefore, the voltage drop will be greater across resistor $R_1$ than that across $R_2$, and point A will be positive with point B. The point A will assume a negative polarity by assuming that the I. F. carrier departs from the assigned frequency value in an opposite direction.

The screen end of envelope 20 may have calibrations placed on it to indicate more clearly the central position which corresponds to variations solely in carrier amplitude. Furthermore, the off-resonance positions 42 and 42' can be calibrated on the screen so that the user of the receiver is informed as to whether the receiver is detuned to the upper or lower side band of the signal carrier. It is, also, to be understood that the thickness of the line 41 will depend on the relative positioning of the deflection plates and the focusing electrode. Those skilled in the art will readily be able to design the indicator tube electrodes so that the amplitude and/or resonance indications are as pronounced as desired.

While I have indicated and described a system for carrying my invention into effect, it will be apparent to one skilled in the art that my invention is by no means limited to the particular organization shown and described, but that many modifications may be made without departing from the scope of my invention, as set forth in the appended claims.

What I claim is:

1. A method of operating a cathode ray tube of the type including a fluorescent screen, electron beam producing elements and at least two pairs of relatively perpendicular deflection electrodes; which includes impressing between a pair of deflection electrodes an electrical wave of a predetermined resonant frequency, producing a linear indication on the screen in response to variations in the said wave amplitude, and impressing between a second pair of deflection electrodes a direct current voltage whose polarity is a function of the wave frequency departure from said resonant frequency thereby to shift said linear indication on said screen.

2. In a method as defined in claim 1, maintaining said linear indication at a fixed central position on the screen during said wave amplitude variation, and rectifying said wave to produce said direct current voltage.

3. A method of indicating amplitude and frequency variations of the carrier of modulated carrier waves, and which method utilizes a cathode ray tube of the type employing a fluorescent screen, electron beam producing elements and at least two pairs of relatively perpendicular deflection elements; said method including impressing between a pair of the deflection electrodes said waves thereby producing a line indication on the screen whose length is a function of the carrier amplitude, deriving from said waves a direct current voltage whose polarity and magnitude depends upon the sense and amount of frequency departure of the said carrier from an assigned frequency value, and impressing said direct current voltage between a second pair of said deflection electrodes thereby to shift said line indication with respect to a predetermined point on the screen representative of the amplitude variation indication.

4. A method of indicating amplitude and frequency variations of the carrier of modulated carrier waves, which method includes the steps of translating carrier amplitude variations into a visual linear indication whose length is a function of the carrier amplitude, deriving a direct current voltage from the waves whose polarity and magnitude depends upon the sense and amount of frequency departure of the said carrier from an assigned frequency value, and utilizing said direct current voltage to shift said linear indication with respect to a predetermined point representative of the amplitude variation indication.

5. In a carrier wave indicator system, a tube of the type including means providing an electron beam, at least two pairs of relatively perpendicular deflection plates and a fluorescent screen, a carrier wave network tuned to a predetermined frequency, means coupling a pair of said deflection plates to said network thereby to impress carrier waves upon said pair of plates and produce a line indication on said screen whose length is a function of the carrier amplitude variation, means for deriving from the carrier waves in said network a direct current voltage whose polarity is a function of the departure of the carrier frequency from said predetermined frequency, and means for impressing said direct current voltage between a second pair of deflection plates thereby to shift said indication with respect to a point on the screen corresponding to the amplitude variation indication.

6. In a system as defined in claim 5, said deriving means including a rectifier system having an input circuit resonant to said predetermined frequency and coupled to said network.

7. In a system as defined in claim 5, means for maintaining said carrier amplitude line indication at the central portion of said screen, and said second pair of deflection plates being positioned to shift said line indication either to the right or left depending upon the polarity of said direct current voltage.

8. In a carrier wave indicator utilizing a tube of the type provided with an electron emitter, at least two pairs of relatively perpendicular deflection plates and a fluorescent screen, the method which includes focusing an electron beam from said emitter upon said screen to provide a visual indication on the latter, deriving a direct current voltage from the waves whose polarity and magnitude depend upon the sense and amount of departure of the carrier frequency from an assigned frequency value, applying said voltage between one pair of said plates to shift the position of the indication on the screen, and applying wave energy between the second pair of plates thereby to vary said indication linearly.

9. A method of indicating amplitude and frequency variations of the carrier of modulated carrier waves, which method includes the steps of translating carrier amplitude variations into a visual linear indication whose length is a function of the carrier amplitude, and translating the frequency departure of the carrier from an assigned frequency value into shifts of said linear indication, with respect to a predetermined point representative of the amplitude variation indication, which depend on the sense and amount of the frequency departure.

EARL I. ANDERSON.